United States Patent
Fackler et al.

(10) Patent No.: US 10,728,776 B2
(45) Date of Patent: Jul. 28, 2020

(54) SYSTEMS AND METHODS FOR EMERGENCY OPERATION OF A WIRELESS COMMUNICATION SYSTEM

(71) Applicant: CommScope Technologies LLC, Hickory, NC (US)

(72) Inventors: Karl-Heinz Fackler, Wemding (DE); Jaroslav Hoffmann, Donauwörth (DE); Andreas Biehler, Kaisheim (DE); Peter Starek, Donauwoerth (DE); Alexander Kopp, Donauwörth (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/539,388

(22) Filed: Aug. 13, 2019

(65) Prior Publication Data
US 2019/0373488 A1 Dec. 5, 2019

Related U.S. Application Data (63) Continuation of application No. 16/183,176, filed on Nov. 7, 2018, now Pat. No. 10,425,847.
(Continued)

(51) Int. Cl.
*H04B 7/155* (2006.01)
*H04W 24/04* (2009.01)
(Continued)

(52) U.S. Cl.
CPC ............ *H04W 24/04* (2013.01); *H04B 7/026* (2013.01); *H04B 7/2606* (2013.01); *H04B 7/15535* (2013.01); *H04W 4/90* (2018.02)

(58) Field of Classification Search
CPC ........ H04W 24/04; H04W 4/90; H04B 7/026; H04B 7/14; H04B 7/15507; H04B 7/15535
See application file for complete search history.

(56) References Cited

U.S. PATENT DOCUMENTS

| 5,661,471 A | 8/1997 | Kotlicki |
| 6,628,933 B1 * | 9/2003 | Humes .................. H04M 11/04 455/404.1 |

(Continued)

FOREIGN PATENT DOCUMENTS

| JP | H07303049 A | 11/1995 |
| KR | 20110108506 A | 10/2011 |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 2017, pp. 1-397, 3GPP Organizational Partners (ARIB, ATIS, CCSA, ETSI, TSDSI, TTA, TTC).
(Continued)

*Primary Examiner* — Said E Elnoubi
(74) *Attorney, Agent, or Firm* — Fogg & Powers LLC (57) ABSTRACT

In one embodiment, an emergency configuration control device is provided for a communications system that provides wireless RF communication service to a coverage area, wherein the system comprises an RF protection function coupled to at least one power amplifier, protection function configured to disable the power amplifier when the protection function determines that at least one parameter of the power amplifier has deviated outside of an operating specification, the device comprising: an emergency configuration control module executed by a controller, the emergency configuration control module configured to determine when an emergency event is occurring within the coverage area as a function of a first set of input signals; wherein the emergency configuration control module enters phase one operation and inhibits disabling of the power amplifier by
(Continued)

the RF protection function and outputs one or more phase one notification signals in response to determining that the emergency event is occurring.

20 Claims, 6 Drawing Sheets

Related U.S. Application Data (60) Provisional application No. 62/590,762, filed on Nov. 27, 2017.

(51) Int. Cl.
*H04B 7/26* (2006.01)
*H04B 7/026* (2017.01)
*H04W 4/90* (2018.01)

(56) References Cited

U.S. PATENT DOCUMENTS

| 2004/0261121 | A1 | 12/2004 | Bishop |
| 2006/0030274 | A1* | 2/2006 | Kappes ............... H03G 3/3042 455/73 |
| 2006/0205342 | A1* | 9/2006 | McKay, Sr. ............. H04B 3/36 455/11.1 |
| 2019/0166511 | A1 | 5/2019 | Fackler et al. |

OTHER PUBLICATIONS

International Searching Authority, "International Search Report and Written Opinion from PCT Application No. PCT/US2018/059604 dated Feb. 27, 2019", from Foreign Counterpart to U.S. Appl. No. 16/183,176, pp. 1-9, Published: WO.

U.S. Patent and Trademark Office, "Notice of Allowance", U.S. Appl. No. 16/183,176, dated May 14, 2019, pp. 1-17, Published: US.

* cited by examiner

SYSTEMS AND METHODS FOR EMERGENCY OPERATION OF A WIRELESS COMMUNICATION SYSTEM

CROSS-REFERENCE TO RELATED APPLICATIONS

This U.S. Patent Application is a continuation application claiming priority to, and the benefit of, U.S. patent application Ser. No. 16/183,176 titled "SYSTEMS AND METHODS FOR EMERGENCY OPERATION OF A WIRELESS COMMUNICATION SYSTEM" filed on Nov. 7, 2018, which claims priority to, and the benefit of, U.S. Provisional Patent Application No. 62/590,762 titled "SYSTEMS AND METHODS FOR EMERGENCY OPERATION OF A WIRELESS COMMUNICATION SYSTEM" filed on Nov. 27, 2017, which are each herein incorporated by reference in their entirety.

BACKGROUND

A Distributed Antenna System (DAS) typically includes one or more master units that are communicatively coupled with a plurality of remote antenna units. Each remote antenna unit can be coupled directly to one or more of the master units or indirectly via one or more other remote antenna units and/or via one or more intermediary or expansion units. A DAS is typically used to improve the coverage provided by one or more base stations that are coupled to the master units. These base stations can be coupled to the master units via one or more cables or via a wireless connection, for example, using one or more donor antennas. The wireless service provided by the base stations can include commercial cellular service and/or public safety wireless communications.

During emergency situations, public safety responders that arrive at a scene may need to rely on the DAS network at the scene. Often, local regulations require the communications equipment to remain operable to facilitate emergency communications for a specific set of time, for example 90 minutes. However, it is advantageous for the DAS equipment to remain in service beyond such required time, for as long as possible, since each additional minute that service is maintained can be extremely valuable and potentially save additional lives. In contrast with this need, equipment manufactures for electronic equipment are typically focused on incorporated protective circuitry in RF electronics with the purpose of lengthening the service life of the equipment and extending mean time between failure (MTBF) ratings. Equipment self-preservation is implemented by such protective circuitry in order to shut-down equipment and isolate suspected equipment faults or otherwise prevent anomalous operation in order to minimize damage to the equipment. A conflict occurs when DAS equipment-protection circuitry senses a fault condition and deactivates, or at least limits, RF functions or other functions during an emergency situation to deny the public safety responders with access to the communications network they need to properly respond to the event.

For the reasons stated above and for other reasons stated below which will become apparent to those skilled in the art upon reading and understanding the specification, there is a need in the art for systems and methods for emergency operation of a wireless communication system.

SUMMARY

The Embodiments of the present disclosure provide systems and methods for emergency operation of a wireless communication system and will be understood by reading and studying the following specification.

In one embodiment a communications system for providing wireless radio frequency (RF) communication service to a coverage area, the system comprising: a first unit that comprises: downlink circuitry coupled to at least one power amplifier and configured to radiate a downlink radio frequency signal from at least one antenna into the coverage area; uplink circuity coupled to a low noise amplifier and configured to receive from the at least one antenna an uplink radio frequency signal; an RF protection function coupled to the at least one power amplifier, the RF protection function configured to disable the at least one power amplifier when the RF protection function determines that at least one parameter of the at least one power amplifier has deviated outside of an operating specification; an emergency configuration control module executed by a controller, the emergency configuration control module configured to determine when an emergency event is occurring within the coverage area as a function of a first set of input signals, wherein emergency configuration control module is further configured to enter phase one operation and inhibit disabling of the at least one power amplifier by the RF protection function in response to determining that the emergency event is occurring.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide solutions for RF distributed antenna systems and repeater systems that allows the systems to override equipment self-protection functions during emergency conditions in order to enable them to provide full functionality to public safety responders for as long as possible even at the risk of equipment damage.

Figure 1:
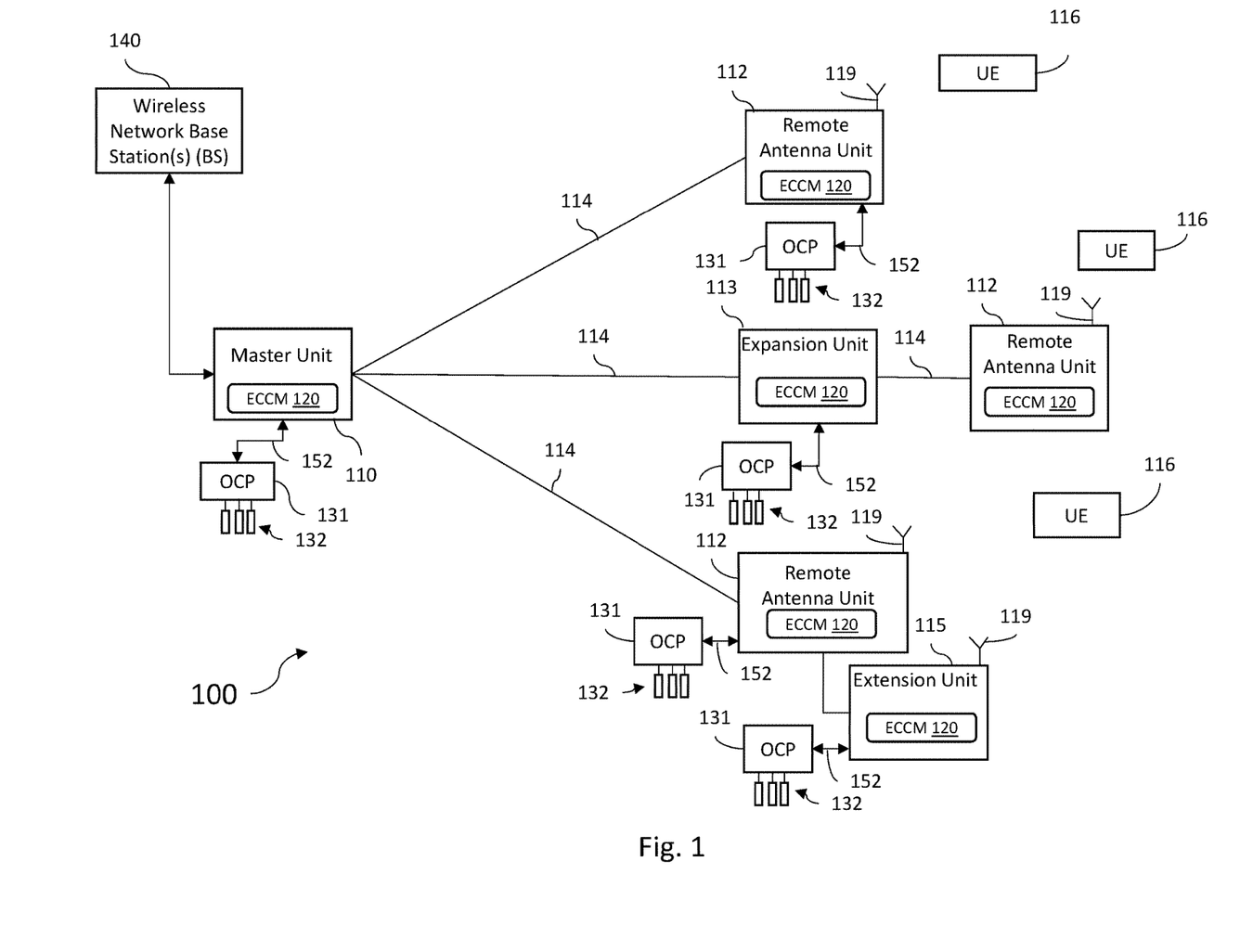
FIGS. 1, 1A, 1B, 1C and 1D are block diagrams illustrating a distributed antenna system and components thereof, of one embodiment of the present disclosure.

FIG. 1 is block diagram of one exemplary embodiment of a distributed antenna system (DAS) 100 that comprises an Emergency Configuration Control (ECC) system comprising Emergency Configuration Control Modules (ECCMs) which are distributed through the master unit, remote antenna unit, and expansion units of the DAS 100 as described herein. Discussed in further detail below, the ECCMs are implemented by controllers within the DAS master unit and remote antenna units and are activated when the DAS is placed into Emergency Mode. When the DAS 100 is not operating in Emergency Mode, standard fault protection remains in place to respond to and/or mitigate equipment anomalies in order avoid equipment damage. When the DAS 100 is placed in Emergency Mode, the ECC system is activated and begins to monitor various sensor and status signal inputs. As a function of those inputs, the ECCMs will output control and alarm signals commiserate with a criticality phase that is derived as a function of the sensor and status signal inputs. One potential response from the ECC system is for the ECCM to output control signals that disables equipment protection circuits in the remote antenna units, among other possible responses as further detailed below. With the protection circuits disabled, the remote antenna units will continue to provide communications functions to public safety responders as long as they are physically able to do so, right up to the point of equipment failure. It should be understood that the descriptions provided herein may apply to repeater systems as well as distributed antenna systems and as such repeater systems embodiments incorporating Emergency Configuration Control Modules such as described herein are expressly contemplated as within the scope of this disclose.

As shown in FIG. 1, the DAS 100 comprises one or more master units 110 that are communicatively coupled to one or more remote antenna units 112 via one or more communication links 114. In various different embodiments, the communication links 114 may comprise wireless communication links, cables (i.e. wired communication links), or some combination thereof. As used herein, the term cable is used generically and may refer to either electrical or fiber optic cables, or hybrid cables comprising both electrical conductors and optical fibers. Is should be understood that DAS 100 may provide wireless telecommunication services to a building, plant, campus, transportation hub, tunnel, or any other type of facility. In some embodiments, the communication links 114 discussed herein may each operate bidirectionally with downlink and uplink communications carried over the link. It should also be understood, however, that in other embodiments, a communication link 114 may itself further comprise a pair of links including, for example, an uplink cable for uplink communication, and a downlink cable for downlink communication. Each remote antenna unit 112 can be communicatively coupled directly to one or more of the master units 110 or indirectly via one or more other remote antenna units 112 and/or via one or more intermediary or expansion units 113. In some embodiments, DAS 100 may further include one or more extension units 115 that are communicatively coupled to a remote antenna unit 112 to further extend coverage.

Each master unit 110 is communicatively coupled to one or more base stations 140. One or more of the base stations 140 can be co-located with the respective master units 110 to which it is coupled (for example, where the base station 140 is dedicated to providing base station capacity to the DAS 100 and is coupled to the respective master units 110). Also, one or more of the base stations 140 can be located remotely from the respective master units 110 to which it is coupled (for example, where the base station 140 provides base station capacity to an area beyond the coverage area of the DAS 100). In this latter case, the master unit 110 can be coupled to a donor antenna and repeater or bi-directional amplifier in order to wirelessly communicate with the remotely located base station 140.

In this exemplary embodiment, the base stations 140 include one or more base stations that are used to provide public and/or private safety wireless services (for example, wireless communications used by emergency services organizations (such as police, fire and emergency medical services) to prevent or respond to incidents that harm or endanger persons or property. Such base stations are also referred to here as "safety wireless service base stations" or "safety base stations." The base stations 140 also can include, in addition to safety base stations, one or more base stations that are used to provide commercial cellular wireless service. Such base stations are also referred to here as "commercial wireless service base stations" or "commercial base stations."

The base stations 140 can be coupled to the master units 110 using a network of attenuators, combiners, splitters, amplifiers, filters, cross-connects, etc., (sometimes referred to collectively as a "point-of-interface" or "POI"). This network can be included in the master units 110 and/or can be separate from the master units 110. This is done so that, in the downlink, the desired set of RF channels output by the base stations 140 can be extracted, combined, and routed to the appropriate master units 110, and so that, in the upstream, the desired set of carriers output by the master units 110 can be extracted, combined, and routed to the appropriate interface of each base station 140. It is to be understood, however, that this is one example and that other embodiments can be implemented in other ways.

Figure 1A:
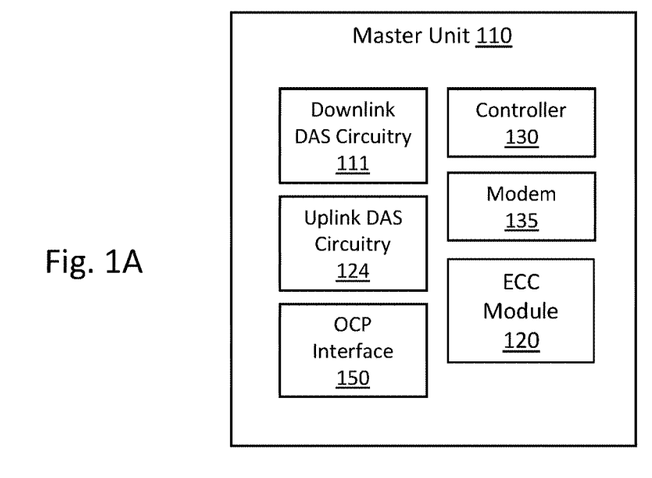

As shown in FIG. 1A, in general, each master unit 110 comprises downlink DAS circuitry 111 that is configured to receive one or more downlink signals from one or more base stations 140. These signals are also referred to here as "base station downlink signals." Each base station downlink signal includes one or more radio frequency channels used for communicating in the downlink direction with user equipment 116 (such as tablets or cellular telephone, for example) over the relevant wireless air interface. Typically, each base station downlink signal is received as an analog radio frequency signal, though in some embodiments one or more of the base station signals are received in a digital form (for example, in a digital baseband form complying with the Common Public Radio Interface ("CPRI") protocol, Open Radio Equipment Interface ("ORI") protocol, the Open Base Station Standard Initiative ("OBSAI") protocol, or other protocol). The downlink DAS circuitry 111 in each master unit 110 is also configured to generate one or more downlink transport signals derived from one or more base station downlink signals and to transmit one or more downlink transport signals to one or more of the remote antenna units 112.

Figure 1B:
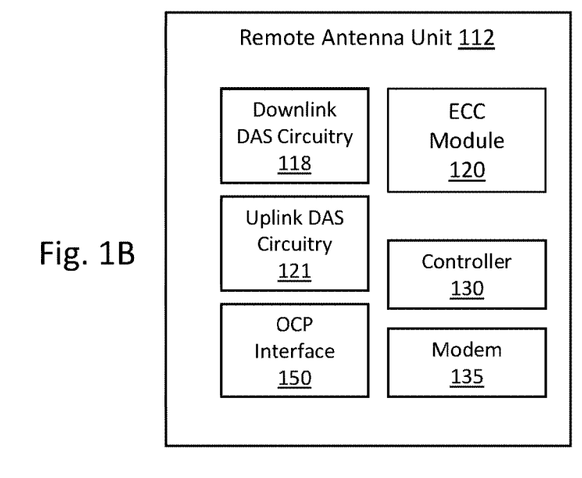

As shown in FIG. 1B, each remote antenna unit 112 comprises downlink DAS circuitry 118 that is configured to receive the downlink transport signals transmitted to it from one or more master units 110 and to use the received downlink transport signals to generate one or more downlink radio frequency signals that are radiated from one or more antennas 119 associated with that remote antenna unit 112 for reception by user equipment 116. These downlink radio frequency signals are analog radio frequency signals and are also referred to here as "remote downlink radio frequency signals." Each remote downlink radio frequency signal includes one or more of the downlink radio frequency channels used for communicating with user equipment 116 over the wireless air interface. In this way, the DAS 100 increases the coverage area for the downlink capacity provided by the base stations 140.

Also, each remote antenna unit 112 comprises uplink DAS circuitry 121 that is configured to receive via antenna (s) 119 one or more uplink radio frequency signals transmitted from the user equipment 116. These signals are analog radio frequency signals and are also referred to here as "remote uplink radio frequency signals." Each uplink radio frequency signal includes one or more radio frequency channels used for communicating in the uplink direction with user equipment 116 over the relevant wireless air interface. The uplink DAS circuitry 121 in each remote antenna unit 112 is also configured to generate one or more uplink transport signals derived from the one or more remote uplink radio frequency signals and to transmit one or more uplink transport signals to one or more of the master units 110.

Each master unit 110 comprises uplink DAS circuitry 124 that is configured to receive the respective uplink transport signals transmitted to it from one or more remote antenna units 112 and to use the received uplink transport signals to generate one or more base station uplink radio frequency signals that are provided to the one or more base stations 140 associated with that master unit 110. Typically, this involves, among other things, combining or summing uplink signals received from multiple remote antenna units 112 in order to produce the base station signal provided to each base station 140. Each base station uplink signal includes one or more of the uplink radio frequency channels used for communicating with user equipment 116 over the wireless air interface. In this way, the DAS 100 increases the coverage area for the uplink capacity provided by the base stations 140.

Figure 1C:
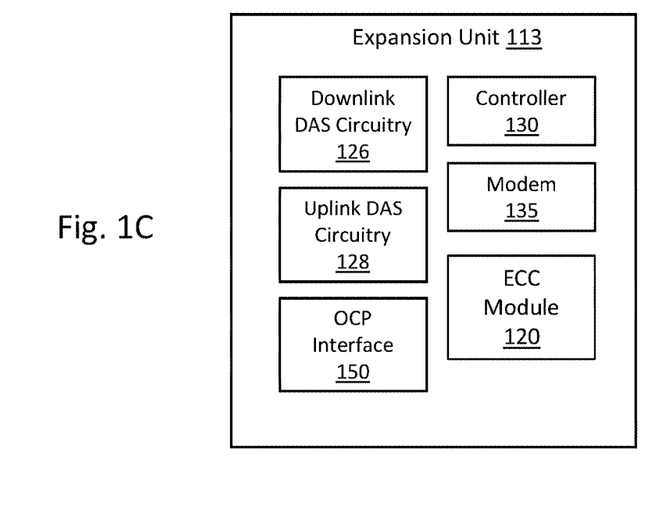

As shown in FIG. 1C, each expansion unit 113 comprises downlink DAS circuitry 126 that is configured to receive the downlink transport signals transmitted to it from the master unit 110 (or other expansion unit 113) and transmits the downlink transport signals to one or more remote antenna units 112 or other downstream intermediary units 113. Each expansion unit 113 comprises uplink DAS circuitry 128 that is configured to receive the respective uplink transport signals transmitted to it from one or more remote antenna units 112 or other downstream intermediary units 113, combine or sum the received uplink transport signals, and transmit the combined uplink transport signals upstream to the master unit 110 or other expansion unit 113. In some embodiments, one or more remote antenna units 112 may be coupled to the one or more master units 110 via one or more other remote antenna units 112 (for examples, where the remote antenna units 112 are coupled together in a daisy chain or ring topology). In such embodiments, an expansion unit 113 may be implemented using a remote antenna unit 112.

Figure 1D:
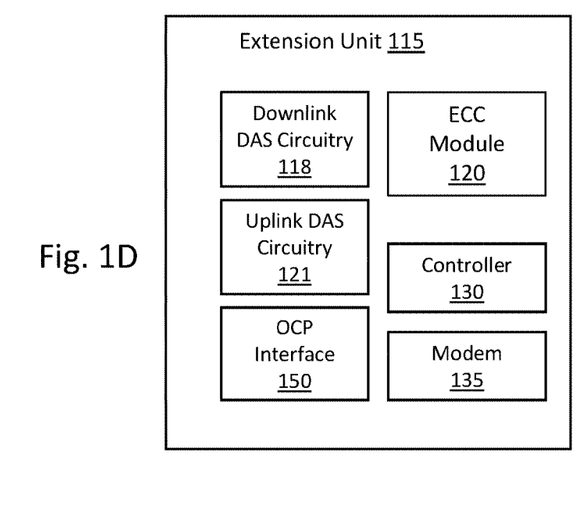

As shown in FIG. 1D, each extension unit 115 may in some embodiments comprises downlink DAS circuitry 118 that is configured to receive the downlink transport signals transmitted to it from a remote antenna unit 112 and to use the received downlink transport signals to generate one or more downlink radio frequency signals that are radiated from one or more antennas 119 associated with that extension unit 115 for reception by user equipment 116. Each downlink radio frequency signal includes one or more of the downlink radio frequency channels used for communicating with user equipment 116 over the wireless air interface. In this way, the DAS 100 may even further increase the coverage area for the downlink capacity provided by the base stations 140. Each extension unit 115 may further comprise uplink DAS circuitry 121 that is configured to receive via antenna(s) 119 one or more uplink radio frequency signals transmitted from the user equipment 116. These signals are analog radio frequency signals and are also referred to here as "uplink radio frequency signals." Each uplink radio frequency signal includes one or more radio frequency channels used for communicating in the uplink direction with user equipment 116 over the relevant wireless air interface. The uplink DAS circuitry 121 in each extension unit 115 may also be configured to generate one or more uplink transport signals derived from the one or more remote uplink radio frequency signals and to transmit one or more uplink transport signals to the remote antenna unit 112 to which it is coupled. In some embodiments, the uplink DAS circuitry 121 in a remote antenna unit 112 may be further configured to receive the respective uplink transport signals transmitted to it from an extension unit 115 and to use the received uplink transport signals to generate uplink radio frequency signals that are provided to the master unit 110.

The downlink DAS circuitry 111, 118, and 126 and uplink DAS circuitry 124, 121, and 128 in each master unit 110, remote antenna unit 112, expansion unit 113, and extension unit 115, respectively, can comprise one or more appropriate connectors, attenuators, combiners, splitters, amplifiers, filters, duplexers, analog-to-digital converters, digital-to-analog converters, mixers, field-programmable gate arrays (FPGAs), microprocessors, transceivers, framers, etc., to implement the features described above. Also, the downlink DAS circuitry 111, 118, and 126 and uplink DAS circuitry 124, 121, and 128 may share common circuitry and/or components. For example, some components (such as duplexers) by their nature are shared among the downlink DAS circuitry 111, 118, and 126 and uplink DAS circuitry 124, 121, and 128.

The DAS 100 can use either digital transport, analog transport, or combinations of digital and analog transport for generating and communicating the transport signals between the master units 110, the remote antenna units 112, and any expansion units 113. For the purposes of illustration, some of the embodiments described here are implemented using analog transport over optical cables. However, it is to be understood that other embodiments can be implemented in other ways, for example, in DASs that use other types of analog transport (for example, using other types of cable and/or using analog transport that makes use of frequency shifting), digital transport (for example, where digital samples indicative of the analog base station radio frequency signals and analog remote radio frequency signals are generated and communicated between the master units 110 and the remote antenna units 112), or combinations of analog and digital transport.

Each unit 110, 112, 113, 115 in the DAS 100 can also comprises a respective controller 130. The controller 130 is implemented using one or more programmable processors and memory hardware that execute software that is configured to implement the various features described here as being implemented by the controller 130. The controller 130, the various features described here as being implemented by the controller 130, or portions thereof, can be implemented in other ways (for example, in a field programmable gate array (FPGA), application specific integrated circuit (ASIC), etc.).

Each controller 130 is configured to monitor and control the operation of the associated unit. Each controller 130 is also configured to send and receive management data over the DAS 100. In one embodiment, each unit 110, 112, 113, 115 in the DAS 100 also comprises a modem 135 that is configured to send and receive management data over the DAS 100 by modulating and demodulating one or more carrier frequencies that are used for the purpose of communicating management data. In some embodiments (for example, where digital transport is used in the DAS), a separate modem 135 for modulating and demodulating management data is not used and, instead, the management data is combined with the digital DAS transport data before being supplied to the transport transceiver or other physical layer device.

One or more of the units 110, 112, 113, 115 in the DAS 100 also comprise an interface 150 to couple the controller 130 in that unit 110, 112, 113, 115 to an operator control panel 131 that is deployed near that unit 110, 112, 113, 115. The interface 150 is therefore also referred to here as an "OCP interface 150." Is should be understood that each OCP interface 150 is limited to hardware that relies on manual inputs or interactions from an operator. In some embodiments, other automated equipment (shown at 132) may be coupled to an OCP 131 that senses, measures, or otherwise evaluates physical values like temperature sensors, smoke detectors, and the like. Each such unit 110, 112, 113, 115 can include an appropriate connector to attach a cable 152 (also referred to here as an "OCP cable 152") that is used to couple the unit 110, 112, 113, 115 to the OCP 131. In general, each OCP 131 can be connected to the nearest unit 110, 112, 113, 115 of the DAS 110.

As mentioned above, in addition to potentially providing commercial connectivity to users via consumer bands, DAS 110 also distributes public safety connectivity coverage and private safety communication coverage. In the exemplary embodiment shown in FIG. 1, the master unit 110 and each remote unit 112 may include an Emergency Configuration Control Module (ECCM) 120 that is configured to selectively override protective circuitry among other potential responses.

Figure 2:
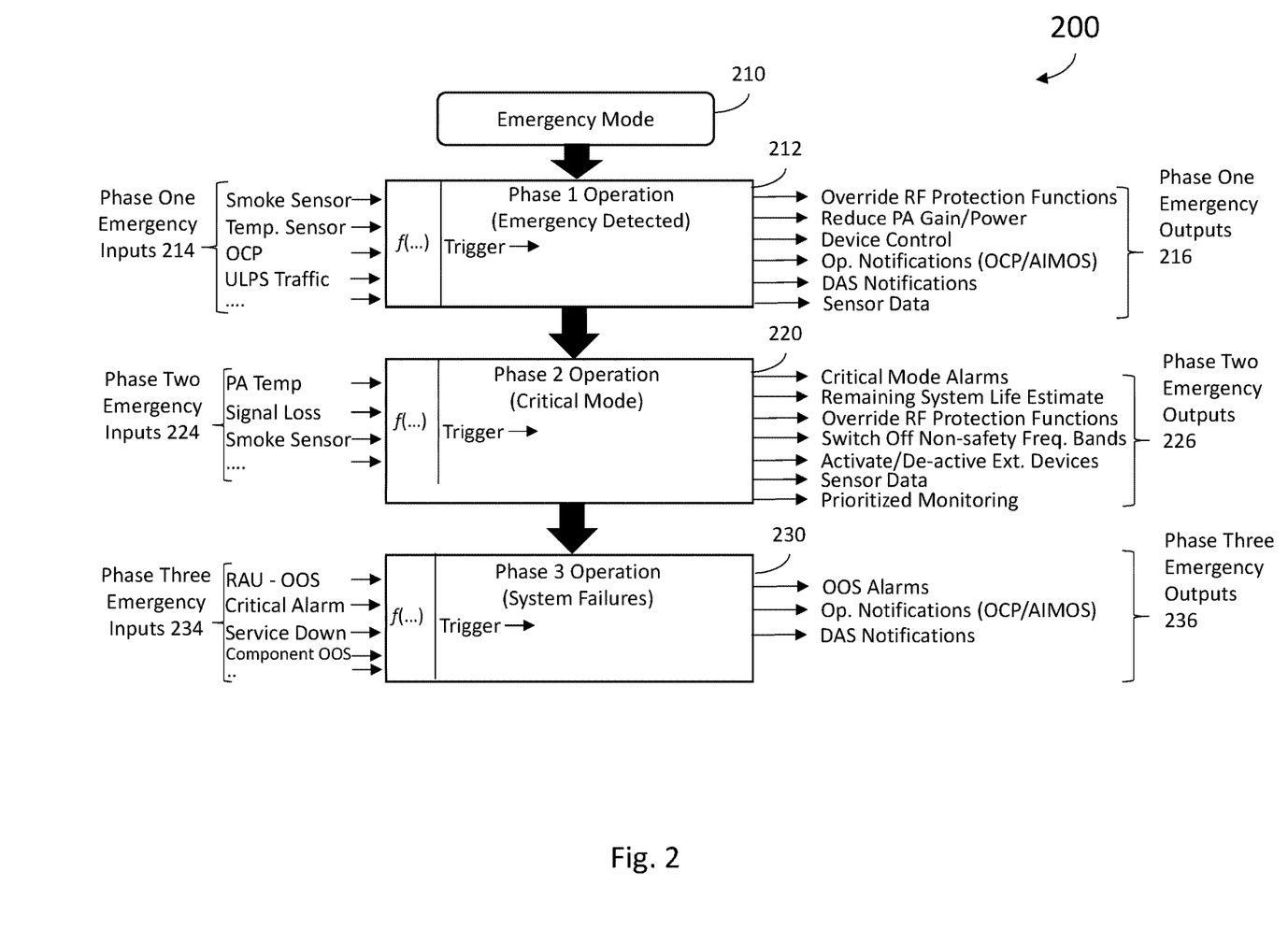
FIG. 2 is a diagram illustrating operation of an Emergency Configuration Control Module of one embodiment of the present disclosure.
Figure 3:
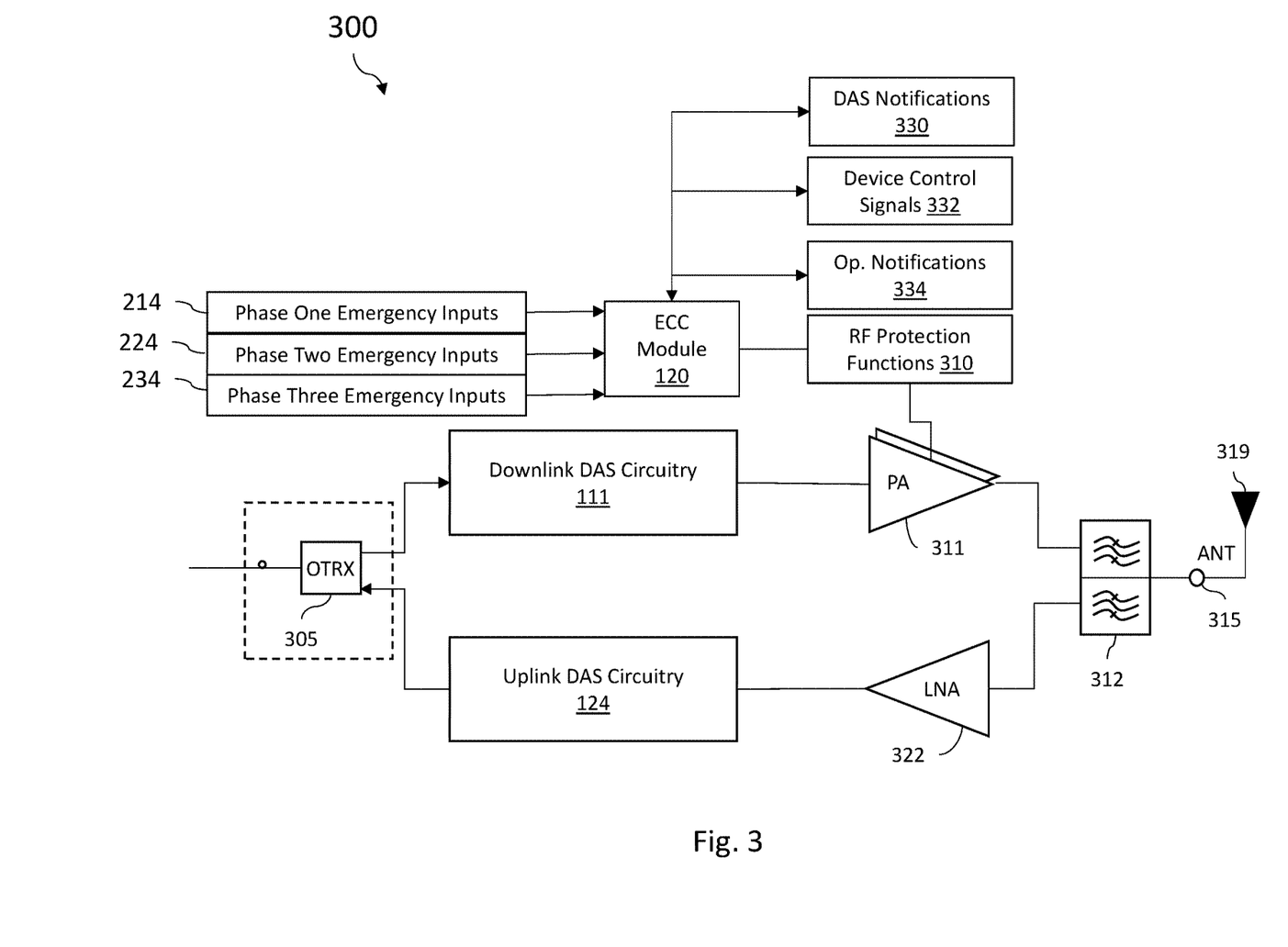
FIG. 3 is a block diagram illustrating an example implementation of an Emergency Configuration Control Module within a remote antenna unit or extension unit of one embodiments of the present disclosure.
Figure 3A:
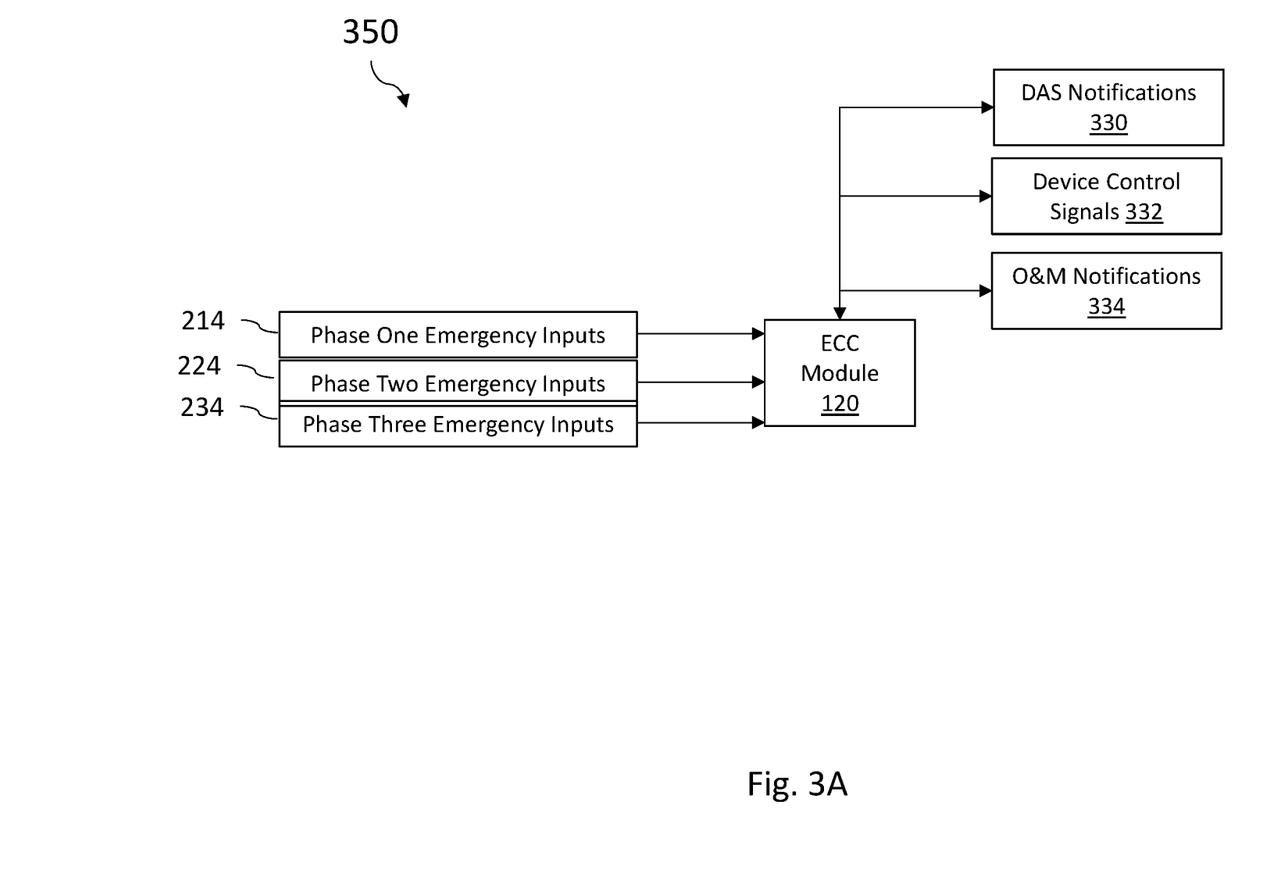
FIG. 3A is a block diagram illustrating an example implementation of an Emergency Configuration Control Module within a master unit or expansion unit of one embodiments of the present disclosure.

FIG. 2 is a diagram illustrating the operation of an Emergency Configuration Control Module 120 which may be incorporated in the DAS 100 shown in FIG. 1 for any other embodiments shown herein. FIG. 3 illustrates one example implementation of an Emergency Configuration Control Module 120 within the context of a remote antenna unit 112 or an extension unit 115. FIG. 3A illustrates generally one example implementation of an Emergency Configuration Control Module 120 within the context of a master unit 110 or expansion unit 113. As shown in FIGS. 3 and 3A, the ECCM 120 receives as inputs, phase one emergency inputs 214, phase two emergency inputs 224 and phase three emergency inputs 234. In response to these inputs, the ECCM 120 may output a combination of notifications and control actions which may include, but are not limited to, disabling and/or adjusting RF Protection Functions 310, DAS Notifications 330, Device Control Signals 332 and Operator Notifications 334, for example. In some of the embodiments presented herein, the functions and logic attributed herein to the ECCM 120 for a particular unit may be implemented as code executed by the unit's controller 130.

FIG. 3 specifically illustrates the implementation of ECCM 120 within a remote antenna unit 112 that further comprises an optical transceiver interface (OTRX) 305 for communicating via optical fiber with the master unit 110 (or alternatively, with an expansion unit 113), a RF power amplifier 311, a duplexer 312, an antenna port 315 that is configured to couple the remote antenna unit 112 to at least one antenna 319, a low noise amplifier (LNA) 322, and the downlink and uplink DAS circuitry 111 and 124 discussed above. In the illustrated embodiments, power amplifier 311 power amplifies downlink signals to a desired power level and feeds it to antenna 319 to radiate to user equipment 116 (not shown in FIG. 3) via duplexer 312. It should be understood, however, that the implementation of ECCM 120 as depicted in FIG. 3 and the corresponding description thereof also applies to the implementation of ECCM 120 within an extension unit 115, with one potential difference being that since an extension unit 115 communicates directly with a remote antenna unit 112, that the optical transceiver interface (OTRX) 305 would be omitted. That is the downlink DAS circuitry 111 of the remote antenna unit 112 and extension unit 115, and the uplink DAS circuitry 124 of the remote antenna unit 112 and extension unit 115, may be communicate coupled together by electrical cables or a wireless link.

Uplink radio frequency signals transmitted from user equipment 116 in the coverage area of the remote antenna unit 300 are received via the associated antenna(s) 119 and provided to LNA 322, which amplifies the received uplink signals. The RF circuit protection functions 310 are configured to disable the power amplifier 311 when it determines that at least one parameter has deviated outside of an operating specification for the power amplifier. In one embodiment, RF Protection Function 310 comprises protection and control circuits which operate to disable or otherwise control operation of the power amplifier 311 in order to protect the power amplifiers 311 from damaged caused by overheating, over current, and other faults, and/or otherwise prevent the transition of wireless RF signals outside pre-defined operating parameters. It should also be understood that the electrical component protections afforded by RF protection functions 310 for power amplifier 311 can also be applied to the LNA 322. As such, in the same manner as descried herein for power amplifier 311, the ECCM 120 may output control signals to disable RF protection functions 310 for LNA 322, or otherwise control RF protection functions 310, for example, to permit LNA 322 to operate out of normal RF specification tolerances, reduces gains, and the like.

The emergency configuration control module 120 becomes activated when the DAS 100 is turned to Emergency Mode from normal operations mode. Emergency Mode may be initiated either manually by a public safety responder operating a switch (for example, either before or upon entering the coverage area during an emergency) or via another wired or wireless remote control mechanism. For example, Emergency Mode may be initiated through an input entered by an operator (for example, a public safety responder) via one of the OCPs 131 coupled to the master unit 110, a remote antenna unit 112, or an expansion unit 113. In one embodiment, an emergency mode signal from an OCP 131 is transmitted to the controller 130 of the Master Unit 110. As opposed to manual activation of Emergency Mode, in some embodiments Emergency Mode may be initiated in response to sensor signals, or changes in the pattern of communications traffic on public service frequencies supported by DAS 100. For example, signals from smoke detectors or temperature detectors may be monitored and when smoke and/or emergency temperature thresholds are triggered, and corresponding signal is transmitted to the controller 130 of the Master Unit 110. In other embodiments, an ECCM 120 of a Master Unit 110, Expansion Unit 113 or Remote Antenna Unit 112 may monitor the uplink DAS circuitry 121 for communications traffic on the public safety frequency bands. An increase in such traffic above a nominal threshold would indicate that public safety operators are responding to an event at the facility and the ECCM 120 of a Master Unit 110 would be so notified. For any of these examples, the ECCM 120 of the Master Unit 110 in turn conveys the emergency mode signal out to the controller 130 of each of the expansion units 113 and remote antenna units 112 of the DAS 100.

As shown in FIG. 2, the ECCM 120 at the Remote Antenna Unit 112 may enter phase one operation (shown at 212) by receiving an emergency mode signal (shown at 210), or based on other phase one emergency inputs (shown at 214) received by the ECCM 120. It should be noted that entry into phase one operation does not imply that the RF circuitry of the Remote Antenna Unit 112 is overheating or is otherwise failing or about to fail. Instead, entry into phase one operation means that the Remote Antenna Unit 112 will now operate in a mode where immediate communication service continuity becomes the primary consideration over long term equipment protection.

The phase one emergency inputs 214, may include, but are not limited to, control signals from an OCP 131, smoke detector signals, temperature sensor signals, public safety channel uplink traffic measurements, and the like. Signals from sensor devices such as smoke detectors and temperature sensors (for example) may comprise either sensor measurements or alarm signals generated by the sensor devices when measurement thresholds are exceeded. In general, the phase one emergency inputs 214 are the type of inputs that provide an indication that an emergency is occurring at the facility, rather inputs that necessarily indicate anomalous operation of DAS equipment per se. Moreover, ECCM 120 may consider the phase one emergency inputs 214 as a function of a combination of the input signals when determining whether to trigger phase one operation. For example, the phase one emergency inputs 214 may include a temperature input that triggers when a detected temperature in the proximity of a master unit, expansion unit, or remote antenna unit 112 exceeds 75 deg. C. That trigger, absent any other input trigger, may not be considered sufficient to enter phase one operation. Similarly, a smoke detector trigger absent any other input trigger, may not be considered sufficient to enter phase one operation. However, the combination of a detected temperature that exceeds 75 deg. C together with a smoke detector trigger may be sufficient to enter phase one operation. Similarly, an increase in public safety channel uplink traffic measurements along may in some implementations be considered sufficient to enter phase one operation, but not in others. However, the combination of a detected increase in public safety channel uplink traffic together with a smoke detector trigger could be defined as sufficient to enter phase one operation.

As discussed above, entry into phase one operation 212 places the DAS 100 in a mode where immediate communication service continuity becomes the primary consideration over long term equipment protection. In response, the ECCM 120 may output one or more phase one emergency outputs 216. For example, in one embodiment in response to entering phase one operation 212, the ECCM 120 outputs a control signal that disables RF protection functions 310 such as power amplifier 311 protection circuits that would, under non-emergency operation, automatically switch off the power amplifier 311 in case of sensed overheating, overcurrent, or other fault conditions, for example. In some embodiments, RF protection functions 310 may be controlled to permit the power amplifier 311 and other Remote Antenna Unit 112 circuits to operate out of normal RF specification tolerances, such as with higher flatness, lower rated output power, and so forth, regardless as to whether such operation continues to meet the relevant telecom standards. For example, in one embodiment, error correction for power amplifier 311 (for example, feed-forward and/or pre-distortion correction) may be switched off in response to a phase one emergency input 214 from a temperature sensor reaching a certain temperature threshold. The result may degrade communications quality due to slightly higher intermodulation signals (which under normal operation would not be permitted) but has the advantage when operating in emergency mode of saving power consumption to allow a Remote Antenna Unit 112 to operate at higher temperatures. Similarly, the gain and/or broadcast power of the power amplifier 311 may be reduced when operating in emergency mode in order to reduce heat generated by the power amplifier 311, which may extend the time in which the Remote Antenna Unit 112 may continue to provide communications at elevated ambient environment temperatures.

In addition to trying to lessen heat dissipated by the power amplifier, in one or more areas of the facility serviced by DAS 100, it may be necessary to add functionality and/or to increase the power consumption of electrical components inside the Remote Antenna Unit 112 slightly (for example, by activating a fan or cooling element such as a Peltier element) to allow operation at elevated ambient temperatures. In one embodiment, during phase one operation, the ECCM 120 may output device control signals (shown at 332) to operate a fan within the Remote Antenna Unit 112 to operate at maximum fan speed so that the electrical components are working at lower temperature, which would allow continued operation of the Remote Antenna Unit 112 in a higher allowed ambient temperature. Any potential disadvantage of higher acoustic noise due to the higher fan speed is acceptable in an emergency case. In one embodiment, the ECCM 120 may control uplink DAS circuity 124 to compensate the optical wavelength of uplink transmission to make sure that the optical wavelength is constant at higher temperatures so that communications between the master unit 110 and remote antenna units 112 are maintained.

Phase one emergency outputs 216 may further comprise notification signals. For example, in one embodiment, the ECCM 120 may output an operator notification (shown at 334) to the OCPs 131 so that public safety responders are made aware of that a Remote Antenna Unit 112 has entered phase one operation 212. In some embodiments, the operator notification output 334 may comprise a notification to an offsite monitoring and control system (such as an Andrew Integrated Management and Operating System (A.I.M.O.S.), for example) so that system operators may become aware that an emergency condition has been detected at the facility.

In other embodiments, the phase one emergency outputs 216 may include a DAS notification 330 to the master unit 110 indicating that the Remote Antenna Unit 112 has entered phase one operation 212. As mentioned above, a DAS notification 330 output from a remote antenna unit 112 may comprise an input to the master unit 110's ECCM 120 to trigger transmission of the emergency mode signal 210 to other Remote Antenna Units 112 and/or expansion units 113 of DAS 100. In still other embodiments, raw sensor data from the phase one emergency inputs 214 may also be communicated in any notifications to the master unit 110, OCPs 131 and/or offsite monitoring and control system.

In contrast to phase one operation 212, which is triggered by inputs 214 indicative of an emergency at the facility, entry into phase two operation 220 by the ECCM 120 occurs when an input is received that indicates that events are now causing degradations to the DAS 100 itself, and those degradations will likely result in an imminent loss of communication services. As illustrated in FIG. 2, entry into phase two operation 220 may be triggered as a function of a combination of phase two emergency inputs 224 received by the ECCM 120. Examples of phase two emergency inputs 224 include, but are not limited to, sensor signals indicating unacceptable power temperature readings from the power amplifier 311, and/or smoke within the remote antenna unit 112 itself. Phase two emergency inputs 224 may also include signal loss measurements to detect increasing signal losses (for example, increasing optical power loss or increases in bit error rates or signal to noise ratios) in traffic carried by the one or more communication links 114 of the DAS 100. Signals from sensor devices such as smoke detectors and temperature sensors (for example) may comprise either sensor measurements or alarm signals generated by the sensor devices when measurement thresholds are exceeded.

As opposed to merely detecting elevated ambient temperatures in the vicinity of the Remote Antenna Unit 112, a phase two emergency input 224 for power amplifier temperature may be triggered when a temperature sensor indicates that the power amplifier 311 has reached or exceeds its rated service temperature. In other words, the power amplifier 311 is actively overheating and cannot continue long term continuous operation. Detection of increasing signal losses similarly indicate that equipment is malfunctioning. For example, measurements of signal losses in traffic carried by the one or more communication links 114, in excess of acceptance criteria, may be an indication of structural failures or overheating that is compromising the physical integrity of the DAS 100, for example.

In response to entering phase two operation 222, in one embodiment the ECCM 120 outputs phase two emergency outputs 226 which may include critical mode alarms to the OCPs 131, offsite monitoring and control system (for example, A.I.M.O.S.), and/or other units of the DAS 100 to provide warning to the public safety responders that the DAS 100 is now operating under degraded conditions and that continued reliable communications over DAS 100 is in jeopardy. In some embodiments, a phase two emergency output 226 may further include notification comprising an estimate of the life time remaining before service from that remote antenna unit 110 is lost. Such estimates may be calculated by an algorithm executed by the controller 130 that correlates PA temperature and/or signal losses to estimated remaining life times based on curves or data from tables, for example. With this estimate, public safety responders may plan their activities with more accurate knowledge regarding how long communications will remain available. Raw sensor data from the phase two emergency inputs 224 may also be communicated in any of the notifications to the master unit 110, OCPs 131 and/or offsite monitoring and control system.

As with phase one operation, in phase two operation, the ECCM 120 disables protection functions 310 in order to override protections that would disable the power amplifier 310 due to overheating, or operating outside of other design regulator specifications. In some embodiments where the remote antenna unit includes RF power amplifiers or circuitry for commercial frequency bands in addition to the essential public safety band services, ECCM 120 may switch off the commercial bands allowing the remote antenna unit 112 to save power consumption and therefore operate at higher temperatures. In one embodiment, the commercial bands may be ranked so that ECCM 120 may switch off the commercial bands in a staggered manner based on the ranking. In some embodiments, the ECCM 120 may output device control signals 322 to deactivate optional, non-critical, equipment (such as WLAN routers, for example) to avoid dissipation of additional unnecessary heat into the room occupied by the remote antenna unit 112. Alternatively, other external power consumers controlled or feed by the device control signals 322 could be switched on such as cameras, and standby sensors (such as smoke and/or heat sensors) that can provide additional information to the public safety responders. In addition, during phase two operations, prioritize monitoring may be activated to limit self-check functions and polling to specific critical characteristic such as power amplifier 311 temperature and communications channel loss. Moreover, other devices may be adjusted. For example, in one embodiment, a fan rotation speed could be switched to maximum rotation. The resulting sacrifice of acoustic noise limitations due to the higher fan speed would be acceptable in an emergency case.

Transition from phase two operation 220 to phase three operation 230 occurs when one or more functions of the DAS 100 have degraded to the point of failure and at least some communications coverage within the coverage area has been lost. As illustrated in FIG. 2, entry into phase three operation 230 may be triggered as a function of a combination of phase three emergency inputs 234 received by the ECCM 120. Examples of phase three emergency inputs 234 include, but are not limited to, reception of a critical alarm from the controller 130 that the remote antenna unit 112 is out-of-service (OOS), reception of a critical alarm from another DAS 110 component indicating that the component is out-of-service, or any input indicating that communications traffic has been interrupted. Such alarms may originate from sensors, an OCP 131, or another component of the DAS 100. Upon entry into phase three operation 230, the ECCM 120 will respond with Phase Three Emergency Outputs 236. The ECCM 120 will output DAS Notifications 330 and/or Operator Notifications 334 comprising an out-of-service alarm to notify responders and system operators that the communications system has failed. In some embodiments, the ECCM 120 may repeatedly check for non-permanent failures like failures of intermittent nature. For example, a battery management system may go out of service when system batteries approach or exceed a certain level temperature, but then resume operation as temperature returns to acceptable levels. In such situations where the DAS 100 becomes inoperable but then regains operability, the ECCM 120 can output DAS and/or operator notifications (330, 334) to notify responders and system operators that the communications system has recovered and is back to service again. It should be understood that as conditions degrade and operation transitions to phase one operation 212, to phase two operation 220, and to phase three operation 230, that one or more of the alarms, control signals, override signals, notifications, and so forth from the prior phases of operation may be continued all the way through phase three operation 230 for as long as the controller 120 and ECCM 120 remain in operation and able to do so. Moreover, in some embodiments, activation of the immediately prior phase of operation may be a prerequisite to activation of the later phase of operation.

Figure 4:
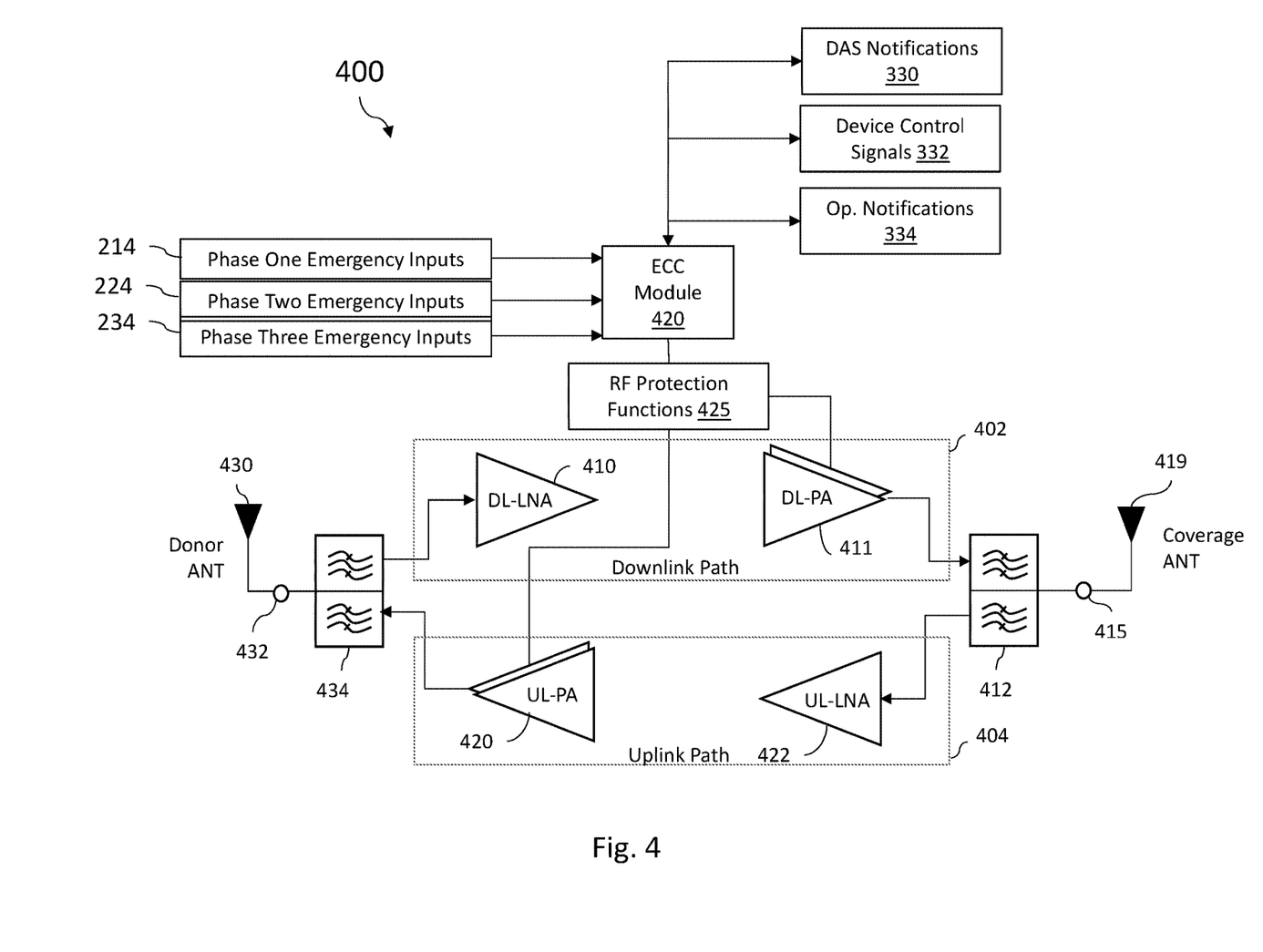
FIG. 4 is a block diagram illustrating an example implementation of an Emergency Configuration Control Module within a repeater system of one embodiments of the present disclosure.

As was mentioned above, utilization of an ECCM 120 such as described above may be used in conjunction with RF signal repeater systems as well as distributed antenna systems. FIG. 4 provides one such example embodiment of a repeater system 400 comprising a downlink path 402 that includes a downlink LNA 410 and a downlink power amplifier 411, and an uplink path 404 that includes an uplink LNA 422 and an uplink power amplifier 420. A first antenna port 432 is configured to couple the uplink power amplifier 420 and downlink LNA 410 to one or more donor antenna(s) 430 via a first duplexer 434. A second antenna port 415 is configured to couple the uplink LNA 422 and downlink power amplifier 411 to one or more coverage antennas 419 via a second duplexer 412. In the illustrated embodiment, power amplifier 411 power amplifies downlink signals from downlink path 402 to a desired power level and feeds it to antenna(s) 419 to radiate to user equipment 116 (not shown in FIG. 4) via duplexer 412. Power amplifier 420 power amplifies uplink signals from uplink path 404 to a desired power level and feeds it to antenna(s) 430 to radiate to network communications equipment (such as wireless network base station(s) 140, not shown in FIG. 4) via duplexer 434.

The repeater system 400 further comprises an ECCM 420. It should be understood that the description of functions and elements attributed herein to the Emergency Configuration Control Module 120 for operation within a DAS embodiment (such as DAS 100) apply as well to the Emergency Configuration Control Module within a repeater system embodiment (such as the ECCM 420 of repeater system 400). Functions and logic attributed herein to ECCM 420 may be implemented as code executed by the unit's controller in the same manner as previously discussed.

In one embodiment, ECCM 420 receives phase one emergency inputs (214), phase two emergency inputs (224), and phase one emergency inputs (234), and responds in the same manner illustrated by FIG. 2 to output DAS Notifications 330, Device Control Signals 332, Op Notifications 334, and disabling and/or adjusting RF Protections Functions 425. Raw sensor data from inputs 214, 224 or 234 may be communicated in any of the notifications to the master unit 110, OCPs 131 and/or offsite monitoring and control system.

The RF circuit protection functions 425 are configured to disable one or both of the power amplifiers 411 and 420 when it determines that at least one parameter has deviated outside of an operating specification for the power amplifiers. In the embodiment of FIG. 4, RF Protection Functions 425 comprises protection and control circuits which operate to disable or otherwise control operation of the power amplifiers 411 and 420 in order to protect the power amplifiers from damaged caused by overheating, over current, and other faults, and/or otherwise prevent the transition of wireless RF signals outside predefined operating parameters. As such, ECCM 420 is configured to override or otherwise manage RF Protection Functions 425 affecting both uplink path 404 and downlink path 402. That is, the ECCM 420 may output a control signal that disables RF protection functions 425 for power amplifiers 411 and 420 that would otherwise automatically switch off the power amplifiers in case of sensed overheating, overcurrent, or other fault conditions. Moreover, RF protection functions 425 may be controlled to permit the power amplifiers 411 and 420 to operate out of normal RF specification tolerances, such as with higher flatness, lower rated output power, and so forth, regardless as to whether such operation continues to meet the relevant telecom standards. Similarly, the gain and/or broadcast power of one or both of the power amplifiers 411 and 420 may be reduced when operating in emergency mode in order to reduce heat generated by the power amplifiers, which may extend the time in which the repeater system 400 may continue to provide communications at elevated ambient environment temperatures. The other functions attributed to ECCM 120 may equally be applied by ECCM 420 for repeater system 400. It should also be understood that the electrical component protections afforded by RF protection functions 425 for power amplifiers 411 and 420 can also be applied to the LNA 410 and 422. As such, in the same manner as descried for power amplifiers 411 and 420, the ECCM 420 may output control signals to disable RF protection functions 425 for LNA 410 and 422, or otherwise control RF protection functions 425, for example, to permit LNA 410 and 422 to operate out of normal RF specification tolerances, reduces gains, and the like.

EXAMPLE EMBODIMENTS

Example 1 includes a communications system for providing wireless radio frequency (RF) communication service to a coverage area, the system comprising: a first unit that comprises: downlink circuitry coupled to at least one power amplifier and configured to radiate a downlink radio frequency signal from at least one antenna into the coverage area; uplink circuity coupled to a low noise amplifier and configured to receive from the at least one antenna an uplink radio frequency signal; an RF protection function coupled to the at least one power amplifier, the RF protection function configured to disable the at least one power amplifier when the RF protection function determines that at least one parameter of the at least one power amplifier has deviated outside of an operating specification; an emergency configuration control module executed by a controller, the emergency configuration control module configured to determine when an emergency event is occurring within the coverage area as a function of a first set of input signals, wherein emergency configuration control module is further configured to enter phase one operation and inhibit disabling of the at least one power amplifier by the RF protection function in response to determining that the emergency event is occurring.

Example 2 includes the system of example 1, wherein the emergency configuration control module further outputs one or more phase one notification signals in response to entering phase one operation.

Example 3 includes the system of example 2, the system further comprising: an operator control panel coupled to the first unit, wherein the emergency configuration control module is configured to receive at least one of the first set of input signals from the operator control panel and further configured to transmit at least one of the one or more phase one notification signals to the operator control panel.

Example 4 includes the system of example 2-3, wherein the emergency configuration control module is communicatively coupled by a network to an offsite monitoring and control system located outside of the coverage area, and configured to transmit at least one of the one or more phase one notification signals to the offsite monitoring and control system.

Example 5 includes the system of any of examples 1-4, wherein the first set of input signals comprises one or more of: a signal from a smoke detector; a signal from a temperature sensor; a signal from an operator control panel; and an emergency mode signal.

Example 6 includes the system of any of examples 1-5, wherein the first set of input signals comprises a measurement of uplink communications traffic through the system in a first frequency band.

Example 7 includes the system of any of examples 1-6, wherein the emergency configuration control module further controls the RF protection function to reduce either a signal power, a signal gain, or both, in response to entering phase one operation.

Example 8 includes the system of any of examples 1-7, further comprising: at least one master unit configured to receive a base station downlink radio frequency signal and to transmit a base station uplink radio frequency signal; wherein the first unit comprises a remote antenna unit that is communicatively coupled to the at least one master unit.

Example 9 includes the system of example 8, wherein the emergency configuration control module is comprised in the at least one master unit, in the remote antenna unit, in an extension unit coupled to the remote antenna unit, or in an expansion unit communicatively coupled to the remote antenna unit and the at least one master unit.

Example 10 includes the system of any of examples 8-9, wherein the emergency configuration control module is comprised in the remote antenna unit and a second emergency configuration control module is comprised in the at least one master unit.

Example 11 includes the system of any of examples 1-10, wherein the first unit comprises a repeater system.

Example 12 includes the system of example 11, wherein the first unit is further configured to receive a base station downlink radio frequency signal and to transmit a base station uplink radio frequency signal.

Example 13 includes the system of any of examples 11-12, wherein the at least one power amplifier comprises an uplink power amplifier and a downlink power amplifier; wherein the emergency configuration control module is further configured to inhibit disabling of the uplink power amplifier and the downlink power amplifier in response to entering phase one operation.

Example 14 includes the system of any of examples 1-13, wherein the emergency configuration control module is further configured to determine when operation of the communications system is degraded as a function of a second set of input signals; wherein the emergency configuration control module is further configured to enter phase two operation in response to determining that the communications system is degraded while the emergency event is occurring; and wherein the emergency configuration control module is further configured to override the RF protection function and output one or more phase two notification signals in response to entering phase two operation.

Example 15 includes the system of example 14, wherein the one or more phase two notification signals include a critical mode alarm transmitted to: at least one operator control panel; and an offsite monitoring and control system located outside of the coverage area and communicatively coupled by a network to the emergency configuration control module.

Example 16 includes the system of any of examples 14-15, wherein the one or more phase two notification signals include a system life estimate calculated by the controller.

Example 17 includes the system of any of examples 14-16, wherein the at least one power amplifier comprises a power amplifier for a first frequency band and a second power amplifier for a second frequency band; wherein the emergency configuration control module is further configured to disable the second power amplifier for the second frequency band in response to entering phase two operation.

Example 18 includes the system of any of examples 14-17, wherein the emergency configuration control module is further configured to control the operation of one or more external electrical components in response to entering phase two operation.

Example 19 includes the system of any of examples 14-18, wherein the second set of input signals comprises one or more of: an indication of signal loss; an indication from a smoke detector of smoke within the unit; and an indication of power amplifier temperature.

Example 20 includes the system of any of examples 14-19, wherein the emergency configuration control module is further configured to determine when communications coverage within the coverage area has been at least partially lost as a function of a third set of input signals; wherein the emergency configuration control module is further configured to enter phase three operation in response to determining that communications coverage within the coverage area has been at least partially lost while the emergency event is occurring; and wherein the emergency configuration control module is further configured to output one or more phase three notification signals in response to entering phase three operation; wherein the one or more phase three notification signals include an out of service alarm transmitted to one or both of: at least one operator control panel; and an offsite monitoring and control system located outside of the coverage area and communicatively coupled by a network to the emergency configuration control module.

Example 21 includes an emergency configuration control device for a communications system that provides wireless radio frequency (RF) communication service to a coverage area, wherein the communications system comprises an RF protection function coupled to at least one power amplifier, the RF protection function configured to disable the at least one power amplifier when the RF protection function determines that at least one parameter of the at least one power amplifier has deviated outside of an operating specification, the device comprising: an emergency configuration control module executed by a controller, the emergency configuration control module configured to determine when an emergency event is occurring within the coverage area as a function of a first set of input signals; wherein the emergency configuration control module is further configured to enter phase one operation and inhibit disabling of the at least one power amplifier by the RF protection function and output one or more phase one notification signals in response to determining that the emergency event is occurring.

Example 22 includes the device of example 21, wherein the emergency configuration control module further controls the RF protection function to reduce either a signal power of the at least one power amplifier, a signal gain of the at least one power amplifier, or both, in response to entering phase one operation.

Example 23 includes the device of any of examples 21-22, wherein the emergency configuration control module is further configured to determine when operation of the communications system is degraded as a function of a second set of input signals; wherein the emergency configuration control module is further configured to enter phase two operation in response to determining that the communications system is degraded while the emergency event is occurring; and wherein the emergency configuration control module is further configured to override the RF protection function and output one or more phase two notification signals in response to entering phase two operation.

Example 24 includes the device of any example 23, wherein the one or more phase two notification signals include a system life estimate calculated by the controller.

Example 25 includes the device of any of examples 23-24, wherein the at least one power amplifier comprises a power amplifier for a first frequency band and a second power amplifier for a second frequency band; wherein the emergency configuration control module is further configured to disable the second power amplifier for the second frequency band in response to entering phase two operation.

Example 26 includes the device of any of examples 23-25, wherein the emergency configuration control module is further configured to control the operation of one or more external electrical components in response to entering phase two operation.

Example 27 includes the device of any of examples 23-26, wherein the emergency configuration control module is further configured to determine when communications coverage within the coverage area has been at least partially lost as a function of a third set of input signals; wherein the emergency configuration control module is further configured to enter phase three operation in response to determining that communications coverage within the coverage area has been at least partially lost while the emergency event is occurring; and wherein the emergency configuration control module is further configured to output one or more phase three notification signals in response to entering phase three operation.

Example 28 includes the device of example 27, wherein the one or more phase one notification signals, one or more phase two notification signals, and one or more phase three notification signals are transmitted to at least one of: a master unit of the communication system; at least one operator control panel within the communication system; and an offsite monitoring and control system located outside of the coverage area and communicatively coupled by a network to the emergency configuration control module.

Example 29 includes the device of any of examples 27-28, wherein the first set of input signals comprises one or more of: a signal from a smoke detector; a signal from a temperature sensor; a signal from an operator control panel; an emergency mode signal; and a measurement of uplink communications traffic through the system in a first frequency band; wherein the second set of input signals comprises one or more of: an indication of signal loss; an indication from a smoke detector of smoke within an electrical device of the communications system that houses the at least one power amplifier; and an indication of power amplifier temperature; and wherein the third set of input signals comprises an indication that a communications coverage within the coverage area has been at least partially lost.

Example 30 includes the device of any of examples 21-29, wherein the communication system comprises either a radio frequency distributed antenna system or a radio frequency repeater system.

In various alternative embodiments, system and/or device elements, method steps, or example implementations described throughout this disclosure (such as any of the master units, remote antenna units, expansion units, controllers, circuitry, Emergency Configuration Control Modules, RF protection functions, control units or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

It should be appreciated that other network architectures may be implemented that still functionally operate in the same manner as described in any of the embodiments described herein. It should also be understood that for any of the embodiments described herein, while the communication links connecting master units and remote antenna units may comprise optical fiber, in other embodiments other wired or wireless communication links, or combinations thereof, may be utilized instead of, or in combination with, optical fiber communication links.

As used herein, DAS and repeater system related terms such as "master unit", "remote unit", "remote antenna unit", "expansion unit", "control unit" and "controller" refer to hardware elements that would be immediately recognized and understood by those of skill in the art of wireless communications and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method for emergency configuration control or a wireless radio frequency (RF) communication system, the method comprising:
identifying when an emergency event is occurring within a coverage area of the wireless RF communication system; and
monitoring the operating state of the wireless RF communication system for degradations during an identified emergency event;
inhibiting an RF protection function from disabling at least one power amplifier of the wireless radio RF communication system during the identified emergency event; and outputting signals in response to identifying wireless RF communication system degradations that occur during the identified emergency event.

2. The method of claim 1, further comprising:
determining when the emergency event is occurring within the coverage area of the wireless RF communication system as a function of a first set of input signals into an emergency configuration control module; and
in response to determining that the emergency event is occurring, causing the wireless RF communication system to enter a first phase of emergency operation that inhibits the RF protection function from disabling the at least one power amplifier of the wireless radio RF communication system.

3. The method of claim 2, further comprising:
controlling the RF protection function to reduce either a signal power of the at least one power amplifier, a signal gain of the at least one power amplifier, or both, in response to entering the first phase of emergency operation.

4. The method of claim 2, further comprising:
determining when operation of the wireless RF communications system is degraded during the emergency event as a function of a second set of input signals into the emergency configuration control module; and
in response to determining that the wireless RF communications system is degraded during the emergency event, causing the wireless RF communication system to enter a second phase of emergency operation.

5. The method of claim 4, further comprising:
outputting a notification signal that includes a system life estimate in response to entering the second phase of emergency operation.

6. The method of claim 4, further comprising:
disabling at least one power amplifier of a plurality of power amplifiers of the wireless RF communications system in response to entering the second phase of emergency operation.

7. The method of claim 4, further comprising:
determine when communications coverage within the coverage area has been at least partially lost during the emergency event as a function of a third set of input signals into the emergency configuration control module; and
in response to determining that communications coverage within the coverage area has been at least partially lost during the emergency event, causing the wireless RF communication system to enter a third phase of emergency operation.

8. The method of claim 2, further comprising:
in response to entering the first phase of emergency operation, the second phase of emergency operation, or the third phase of emergency operation, transmitting a notification signal to at least one of:
a master unit of the communication system;
at least one operator control panel within the communication system; and
an offsite monitoring and control system located outside of the coverage area and communicatively coupled by a network to the emergency configuration control module.

9. The method of claim 1, wherein outputting signals in response to identifying wireless RF communication system degradations that occur during the identified emergency event further comprises:
transmitting notification signals to an offsite monitoring and control system located outside of the coverage area.

10. The method of claim 1, wherein the communication system comprises either a radio frequency distributed antenna system or a radio frequency repeater system.

11. A unit of a wireless radio frequency (RF) communication system, the unit comprising:
an emergency configuration control module executed by a controller, wherein the emergency configuration control module is configured to identify when an emergency event is occurring within a coverage area of the wireless RF communication system, and monitor the operating state of the wireless RF communication system for degradations during an identified emergency event;
wherein the emergency configuration control module is configured to inhibit an RF protection function from disabling of at least one power amplifier of the wireless radio RF communication system during an identified emergency event;
wherein the emergency configuration control module is configured to output signals in response to identifying wireless RF communication system degradations that occur during the identified emergency event.

12. The unit of claim 11, further comprising:
wherein the emergency configuration control module is configured to determine when the emergency event is occurring within the coverage area of the wireless RF communication system as a function of a first set of input signals into the emergency configuration control module; and
wherein the emergency configuration control module is configured, in response to determining that the emergency event is occurring, cause the wireless RF communication system to enter a first phase of emergency operation that inhibits the RF protection function from disabling the at least one power amplifier of the wireless radio RF communication system.

13. The unit of claim 12, further comprising:
wherein the emergency configuration control module is configured to control the RF protection function to reduce either a signal power of the at least one power amplifier, a signal gain of the at least one power amplifier, or both, in response to entering the first phase of emergency operation.

14. The unit of claim 12, wherein the emergency configuration control module is configured to determine when operation of the wireless RF communications system is degraded during the emergency event as a function of a second set of input signals into the emergency configuration control module; and
wherein the emergency configuration control module is configured to, in response to determining that the wireless RF communications system is degraded during the emergency event, cause the wireless RF communication system to enter a second phase of emergency operation.

15. The unit of claim 14, wherein the emergency configuration control module is configured to output a notification signal that includes a system life estimate in response to entering the second phase of emergency operation.

16. The unit of claim 14, wherein the emergency configuration control module is configured to disabling at least one power amplifier of a plurality of power amplifiers of the wireless RF communications system in response to entering the second phase of emergency operation.

17. The unit of claim 14, wherein the emergency configuration control module is configured to determine when communications coverage within the coverage area has been at least partially lost during the emergency event as a function of a third set of input signals into the emergency configuration control module; and wherein the emergency configuration control module is configured, in response to determining that communications coverage within the coverage area has been at least partially lost during the emergency event, cause the wireless RF communication system to enter a third phase of emergency operation.

18. The unit of claim 17, wherein the emergency configuration control module is configured to, in response to entering the first phase of emergency operation, the second phase of emergency operation, or the third phase of emergency operation, transmit a notification signal to at least one of:

a master unit of the communication system;

at least one operator control panel within the communication system; and an offsite monitoring and control system located outside of the coverage area and communicatively coupled by a network to the emergency configuration control module.

19. The unit of claim 11, wherein the output signals in response to identifying wireless RF communication system degradations that occur during the identified emergency event comprise notification signals to an offsite monitoring and control system located outside of the coverage area.

20. The unit of claim 11, wherein the communication system comprises either a radio frequency distributed antenna system or a radio frequency repeater system.

* * * * *